United States Patent Office 3,506,126
Patented Apr. 14, 1970

3,506,126
CLOSED RECIRCULATING HEMODIALYSIS SYSTEM
Earl J. Serfass, St. Petersburg, and Vernon H. Troutner and Edward R. Lindsay, Jr., Clearwater, Fla., assignors to Milton Roy Company, St. Petersburg, Fla., a corporation of Pennsylvania
Filed May 3, 1968, Ser. No. 726,345
Int. Cl. B01d 13/00
U.S. Cl. 210—96
8 Claims

ABSTRACT OF THE DISCLOSURE

A blood dialysis system with continuous, pumped recirculation of the dialysis fluid is described. The dialyzer has a membrane, blood ports for passage of blood through the dialyzer on one side of the membrane and dialysate ports for passage of dialysis fluid, dialysate, through the dialyzer on the other side of the membrane. The dialysate ports are connected in a closed loop with an ultra filter which removes water from the dialysis fluid during recirculation of the dialysis fluid. An adsorber and a sterilizer are provided in the closed loop for further purification of the dialysis fluid. A monitor automatically maintains the proper dialysis fluid composition.

BACKGROUND OF THE INVENTION

One of the most successful means for treating patients suffering from chronic kidney failure is by hemodialysis using an artificial kidney system. In hemodialysis the patient's blood is circulated from an artery through an artificial kidney, or dialyzer, where excess water and waste materials are removed. The blood is returned to the patient's veins. The dialyzer exists in several forms, but all provide essentially the same functions.

One form of dialyzer consists of coiled cellophane tubing immersed in a flowing or standing bath of salt solution.

Blood flows through the tubing and waste materials are transferred to the salt solution. This dialyzer is commonly referred to as a tank type dialyzer. Tank type dialyzers have the disadvantage that they require large amounts of dialysis fluid. Commonly, 100 or 200 liters of dialysis fluid is used in the tank. Furthermore, the concentration of impurities in the dialysis fluid builds up after periods of time thereby reducing dialysis efficiency. The retention of dialysis fluid in a tank for a long period of time also encourages the growth of bacteria.

Another type of dialysis system is commonly referred to as a single pass type of system. Such a system is described in the copending application of Serfass, Martin and Wilson, Ser. No. 563,523 filed July 7, 1966, now U. S. Patent No. 3,441,136, and is described in a paper presented before the Instrument Society of America, 22nd Annual ISA Conference and Exhibit, Sept. 11–14, 1967 by Dr. E. J. Serfass, Preprint Publication No. 26-1-BIOMED-67. A single pass system as described in these references may make use of a Kiil kidney which consists of cellophane sheets sandwiched between grooved plastic boards. Blood passes on one side of the thin cellophane membrane and a salt solution, dialysate, flows on the other side of the membrane. Waste materials and excess water from the blood pass through the membrane by a combination of dialysis; osmosis and ultra filtration and are flushed away by the salt solution. The salt solution containing the impurities and water are run to drain.

While single pass systems have been used quite successfully, they do have the disadvantage that the cost of each dialysis treatment is increased because the dialysis fluid is passed through the membrane only once and then flushed to drain. Further, these systems require precision proportioning equipment for continuously mixing dialysis fluid with controlled temperautre water in exact proportions to provide a continuous supply of dialysis fluid during treatment. Composition of the dialysis fluid must be maintained within a few percent to prevent addition or removal of salts from the blood. Also, waste product concentration in the dialysate must be kept very low to maintain efficient dialysis.

A more significant disadvantage of the single pass system is the undesirable removal and discarding of blood stream constituents, other than waste metabolites. Although as yet largely unidentified, there is indication that hormones, antibodies, etc. are removed and discarded by the single pass system. A system is needed whereby only the undesirable waste metabolites are removed, while all other desirable constituents are retained.

SUMMMARY OF THE INVENTION

This invention relates to a blood dialysis system and more particularly to a system in which a few liters of dialysis fluid is continuously recirculated through a dialyzer and is cleansed during recirculation, thereby reducing system volume and operating costs, and eliminating the requirement for a water supply.

Moreover, the recirculating dialysis fluid may be selectively cleansed to avoid discarding desirable constituents.

In one embodiment of the invention, dialysis fluid is recirculated in a closed loop which includes a dialyzer for removing impurities and water from the blood, an ultra filter for removing the accumulated water from the dialysate, and an adsorber for removing accumulated impurities and some bacteria from the dialysate. In order to maintain the proper dialysate composition, water is removed from the dialysis fluid by controlling the pressure of the fluid applied to the ultra filter. A concentration monitor produces an output signal which controls the pressure at the ultra filter thereby adjusting the rate of water removal to maintain dialysate composition. In one embodiment, a pump maintains and controls the dialysate flow and pressure in the dialyzer, as well as providing pressure for the ultra filter.

Alternately, the system does not contain an ultra filter, but instead the concentration monitor signal controls the addition of small amounts of dialysate concentrate to maintain dialysate composition.

Alternately, the concentration monitor signal controls the amount of dialysate bypassing an ultra filter.

Accordingly, it is an important object of the present invention to provide a blood dialysis system having a significant reduction in system size, weight, complexity and cost over prior art dialysis systems.

Another important object of the present invention is to provide a blood dialysis system in which proper choice of selective adsorbers may remove only the undesirable blood constituents while retaining the desirable constituents.

The foregoing and other objects, features and advantages of the invention will be better understood from the following more detailed description and appended claims together with the drawings.

DESCRIPTION OF A PARTICULAR EMBODIMENT

Figure 1:
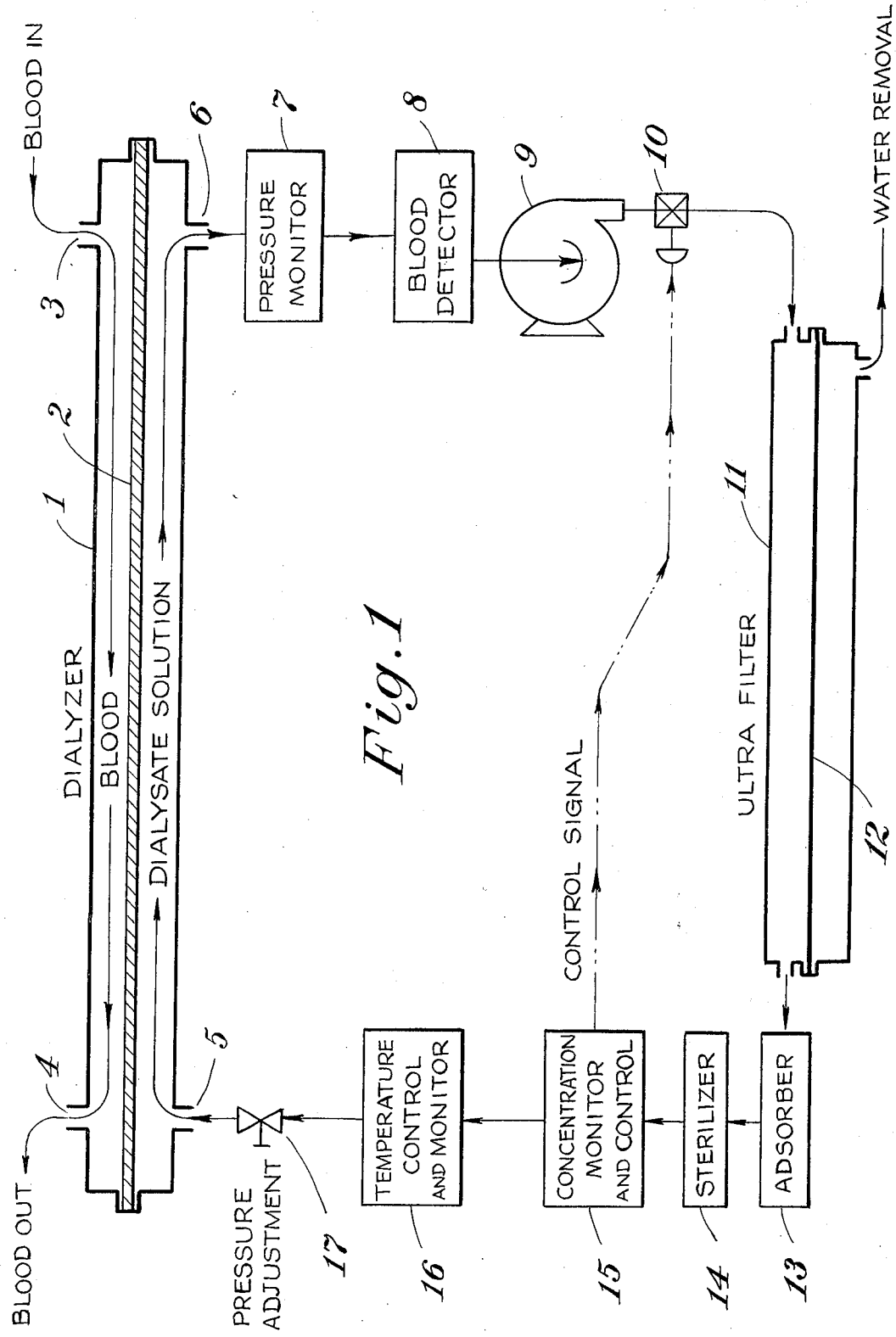
FIG. 1 shows a flow diagram of the invention.

Referring now to FIG. 1, the dialyzer 1 includes a membrane 2. Blood ports 3 and 4 are provided for the passage of blood through the dialyzer on one side of the membrane. An inlet dialysate port 5 and an outlet dialysate port 6 are provided for passage of dialysis fluid through the dialyzer on the other side of the membrane.

The dialysate solution from the outlet dialysate port 6 passes through a pressure monitor 7 and a blood detector 8. As discussed more fully in the above-mentioned Serfass ISA paper and in patent application Ser. No. 563,523, the monitor circuits, including the pressure monitor 7 and blood detector 8, all have relay contacts connected in series to control the energization of an alarm relay. Only when the alarm relay is in its energized condition can dialysis treatment be performed. That is, if either the pressure monitor indicates that the outlet pressure is not within preset limits or if the blood detector indicates the presence of blood in the dialysis fluid, the alarm relay will be deenergized which will stop the dialysate pump and discontinue dialysis.

A pump 9 provides the proper flow and pressure of dialysis fluid through the dialyzer 1. The pump discharges dialysis fluid under pressure to the pressure control valve 10. Dialysis fluid under controlled pressure is supplied to the ultra filter 11 which includes a semi-permeable membrane 12, through which excess water is removed from the dialysate. The membrane 12 has what is usually referred to as mille porosity. It is also referred to as being an ultra filter. Such membranes are available commercially. For example, rubber or plastic membranes are available for use in the desalinization of water. As an alternative to the use of a rubber or plastic membrane, the ultra filter 11 may be a ceramic tube in which ferroferricyanide (Prussian Blue) has been precipitated in the pores. Such a tube will be a good filter for removing water from the dialysis solution which passes therethrough.

The dialysis fluid is then supplied to an adsorber 13 for removing waste impurities from the dialysis fluid. A good adsorber for removing the impurities commonly contained in the dialysis fluid is activated carbon which has been presaturated with a salt solution so that the adsorber will not remove sodium salts from the dialysis fluid. In similar fashion, the adsorber may be presaturated with other constituents to prevent their removal from the dialysate, thereby giving the desired adsorber selectivity. The adsorber 13 does remove organics and bacteria from the dialysis fluid. In order to destroy bacteria and certain virus in the dialysis fluid, the fluid is sterilized in the sterilizer 14.

After sterilization, the dialysis fluid is supplied to a concentration monitor 15. The concentration monitor 15 is of the type which produces an electrical output signal representing the electrical conductivity of the dialysis fluid. The conductivity is a good measure of the amount of water in the dialysis fluid. Water removed from the blood in the dialyzer must be removed by the ultra filter. If too much water is being removed from the dialysis fluid, the salt concentration will increase and the concentration monitor 15 will sense the increased conductivity of the dialysis fluid. The resultant electrical signal is applied to the control valve 10 to reduce the pressure of the dialysis fluid supplied to the filter 11. If the filter 11 does not remove enough water, the salt concentration will decrease and the concentration monitor 15 detects the reduced conductivity of the fluid to produce an electrical signal which increases the pressure of the fluid supplied to the filter 11. Under increased pressure, more water will diffuse through the membrane 12.

The function of temperature control and monitor 16 is to control the temperature of the dialysis fluid supplied to the dialyzer within the desired limits. The temperature monitor is also connected into the alarm circuit. A pressure reducing valve 17 is provided in the closed loop to supply the dialysis fluid under constant desired pressure to the dialyzer 1.

The flow rate of blood and dialysis fluid through the system and the amount of water removed will be dependent upon the particular patient under treatment. However, the following are exemplary flow rates: Flow of blood between blood ports 3 and 4, about 200 cc. per minute; flow of dialysis fluid between dialysate ports 5 and 6, about 500 cc. per minute; and water removal by the ultra filter, about 4 cc. per minute.

Normally, the amount of dialysis fluid in the closed loop will be sufficient to provide a fixed volume source of dialysis fluid for the dialyzer. Under certain circumstances, it may be desirable to provide a greater volume of fluid in the source. In this case a separate reservoir can be included in the closed loop, for example, between valve 10 and filter 11.

Figure 2:
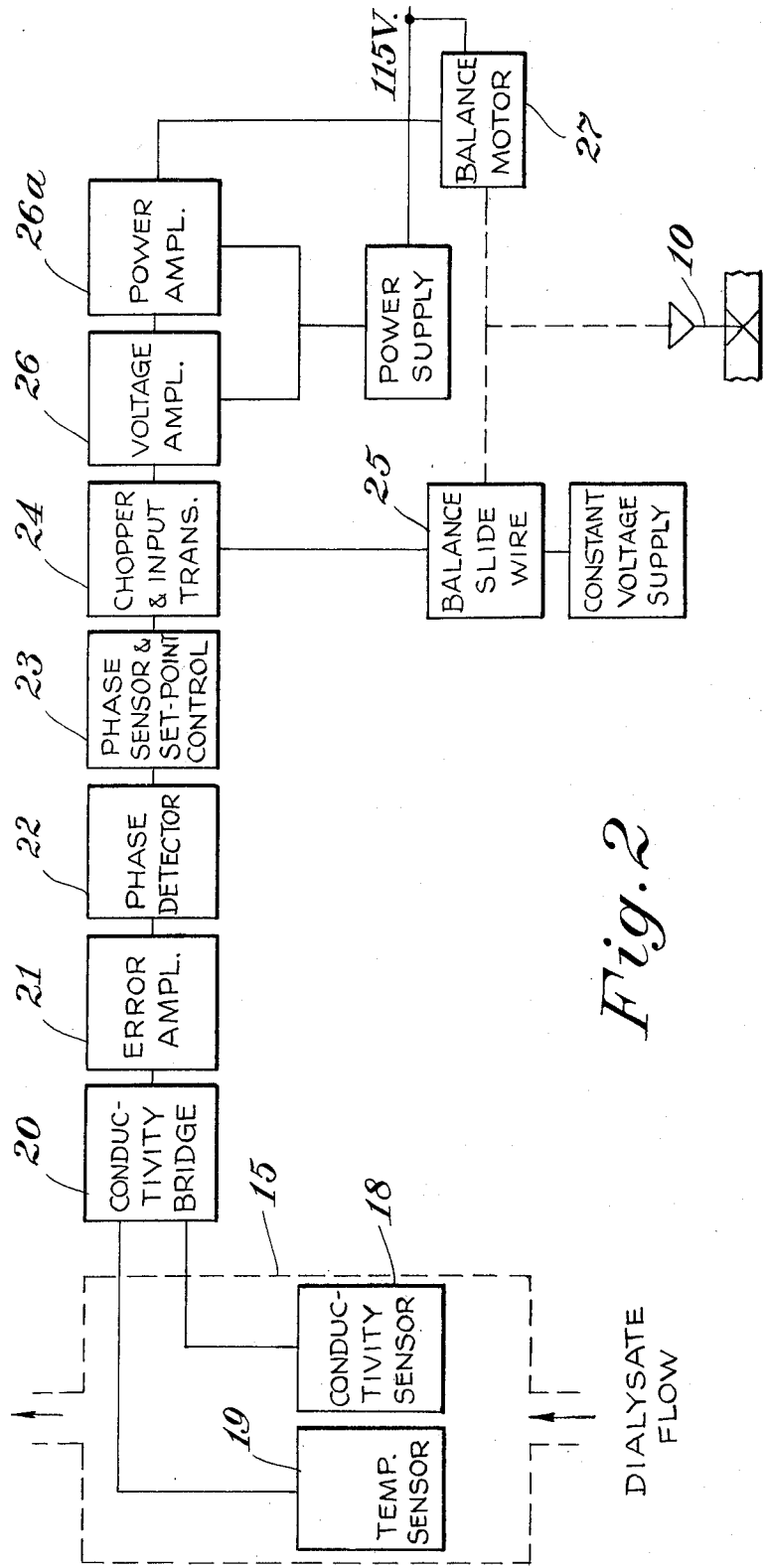
FIG. 2 shows a block diagram of the electrical control system.

Components of the type listed below are suitable for use in the system of FIG. 1:

Dialyzer 1—Kiil Dialyzer of the type available from the Milton Roy Company as the Kiil-Roy Dialyzer
Pressure Monitor 7—Isolated pressure gage with alarm contacts available from the Milton Roy Company
Blood detector 8—Erythrolyzer blood leak detector available from the Milton Roy Company
Pump 9—Positive displacement constant flow chemical transfer pump available from the Milton Roy Company
Ultra filter 11—Ceramic tube having ferroferricyanide (Prussian Blue) precipitated in the pores thereof, or rubber, or plastic osmotic type membrane which permits passage of molecular water but not ions or larger molecules
Adsorber 13—Activated carbon or other suitable adsorbent
Sterilizer 14—Ultra violet lamp
Concentration monitor 15—Conductivity cell available from the Milton Roy Company
Temperature control and monitor 16—Thermistor sensor
Immersion heater
Thermoswitch or SCR control
Valve 17—Regulating needle valve The system for controlling the valve 10 in accordance with the control signal from the concentration monitor can be of well known type. One suitable system is shown in block form in FIG. 2. The conductivity cell includes a sensor 18 for determining conductivity. Another sensor 19 which is temperature sensitive provides temperature compensation. The sensors 18 and 19 are connected in a bridge circuit 20. Variations in the conductivity from a given set point produce an error signal which is amplified in amplifier 21. The phase detector 22 senses the phase of the error signal which is an indication of whether the conductivity is above or below the set point. The error signal is compared with an adjustable set point in the set point control 23.

As in most conventional control systems of this type, a chopper 24 is provided to produce an AC control signal having an amplitude related to the difference between the voltage from set point control 23 and the voltage from the balance slide wire 25. When these two voltages are in balance, the amplitude of the AC signal at the output of the chopper is zero. The AC signal is amplified in two amplifying stages 26 and 26a and is applied to the balance motor 27. The balance motor drives the pressure control valve 10 as well as the balance slide wire to position the valve to a point which will produce the desired conductivity.

MODIFICATIONS OF THE INVENTION

Figure 3:
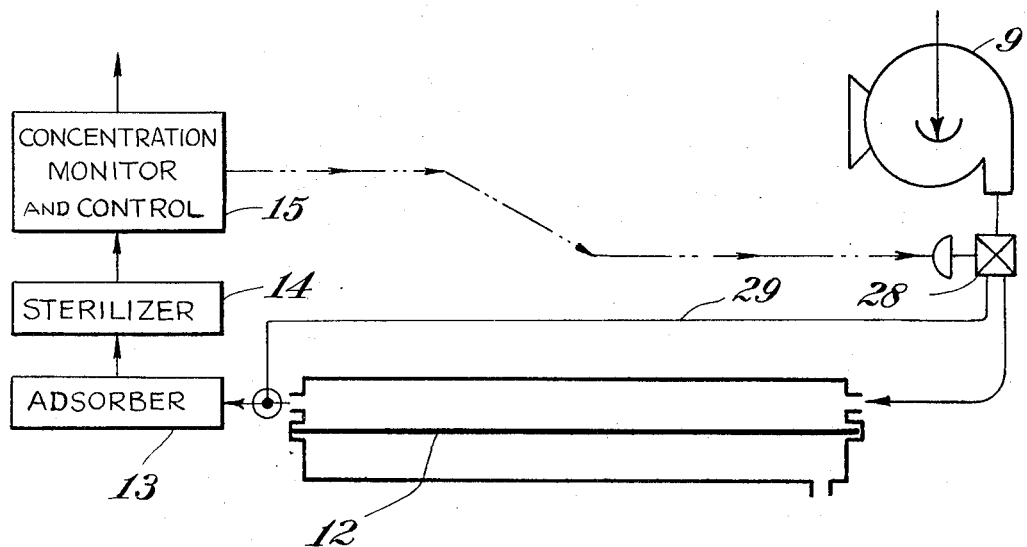
FIGS. 3 and 4 show modifications of the invention.

One modification of the invention is shown in FIG. 3 wherein like reference numerals denote like components in FIG. 1. In this modification the pressure reducing valve is replaced by a bypass valve 28. The bypass valve 28 supplies the dialysis fluid to the ultra filter 12 or to a bypass 29 around the ultra filter. The proportion of dialysis fluid passing through filter 12 and through bypass 29 is controlled in accordance with the concentration of the fluid. When too much water is removed from the dialysis fluid, the bypass valve 28 is actuated to divert more of the fluid through the bypass 29 so that water is not removed from the bypassed portion.

Figure 4:
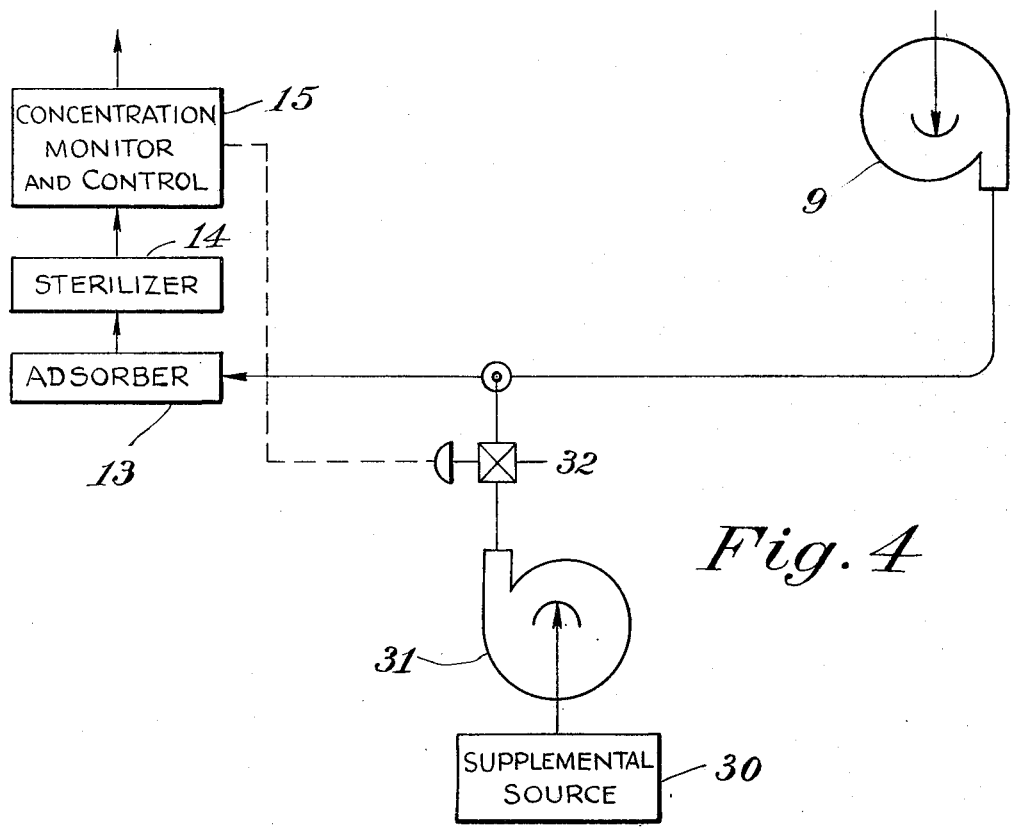

Another modification is shown in FIG. 4 wherein like reference numerals denote like components in FIG. 1. In this modification the ultra filter is not used. Rather, a supplemental source of dialysis fluid 30 is provided. A pump 31 supplies fluid from this supplemental source through control valve 32 to a junction in the closed loop. When the concentration monitor and control 15 senses that the amount of water in the recirculating fluid has increased, the valve 32 is opened to supply more dialysis concentrate from the source 30 into the system. In this manner, the dilution effects of the accumulated water are offset, thereby making water removal unnecessary.

What is claimed is:

1. A blood dialysis system comprising:
 a dialyzer having a membrane, blood ports for passage of blood through said dialyzer on one side of said membrane, and an inlet dialysate port and an outlet dialysate port for passage of dialysis fluid through said dialyzer on the other side of said membrane,
 a source containing a fixed volume of dialysis fluid supplied to said dialysate ports, and
 means connected in a closed loop with said dialysate ports for controlling the concentration of said dialysis fluid to maintain the required composition of said dialysis fluid, said means including an ultrafilter connected in said closed loop with said dialysate ports and said source of dialysis fluid to remove water from said dialysis fluid during recirculation of said dialysis fluid in said closed loop.

2. The system recited in claim 1 further comprising:
 an adsorber connected in said closed loop to remove impurities from said dialysis fluid during recirculation.

3. The system recited in claim 1 further including:
 a sterilizer connected in said closed loop to restrict bacteria in said dialysis fluid during recirculation.

4. The system recited in claim 1 wherein said ultra filter includes:
 a permeable membrane having mille porosity permitting the passage of water therethrough but inhibiting the passage of salts in said dialysis fluid,
 means for removing water from the other side of said membrane,
 and wherein said system further includes:
 a pump connected in said closed loop between said outlet dialysate port and said ultra filter to supply said dialysis fluid under pressure to one side of said membrane.

5. The system recited in claim 4 further comprising:
 pressure controlling means for controlling the pressure of dialysis fluid supplied to said ultra filter, and
 means for monitoring the amount of water removed from said dialysis fluid in said ultra filter, said pressure controlling means being responsive to said means for monitoring to maintain the water removal at the proper level.

6. The system recited in claim 4 further comprising:
 a concentration monitor producing an electrical output representing the conductivity of the dialysis fluid at the outlet of said ultra filter, and
 an electrically controlled pressure control valve connected between said pump and the inlet of said ultra filter, the electrical output of said concentration monitor being applied to control said pressure control valve to reduce the pressure of the dialysis fluid supply to said ultra filter when said concentration monitor indicates that too much water is being removed from said dialysis fluid.

7. The system recited in claim 1 further comprising:
 a bypass around said ultra filter,
 a concentration monitor producing an electrical output representing the conductivity of the dialysis fluid at the outlet of said ultra filter, and
 an electrically controlled valve connected in said bypass and controlled by said electrical signal to bypass dialysis fluid around said filter when said concentration monitor indicates excessive water removal.

8. The system recited in claim 1 wherein said means for controlling includes:
 a supplemental source of dialysis fluid,
 a concentration monitor producing an electrical signal representing the conductivity of the dialysis fluid in said closed loop, and
 an electrically controlled valve responsive to said electrical signal and connected in said closed loop to add dialysis fluid from said supplemental source to said source containing a fixed volume when said concentration monitor indicates an excessive water level in said dialysis fluid.

References Cited

UNITED STATES PATENTS 3,406,826 10/1968 Willock.

OTHER REFERENCES

Blaney et al., "Adsorption: A Step Toward a Wearable Artificial Kidney," from Trans. Amer. Soc. Artif. Int. Organs, vol. xiii, pp. 7–11 relied on, received in Patent Office July 6, 1966.

Murray et al., "Twenty-five Months' Experience in the Treatment of Chronic Uremia at an Outpatient Community Hemodialysis Center," from Trans. Amer. Soc. Artif. Int. Organs, vol. x, received in Patent Office June 25, 1964, pp. 191–199 relied on.

REUBEN FRIEDMAN, Primary Examiner

F. A. SPEAR, Jr., Assistant Examiner

U.S. Cl. X.R.

210—195, 254, 258, 259, 321, 416